United States Patent [19]
Bolger

[11] 4,066,625
[45] Jan. 3, 1978

[54] UNITARY CURABLE RESIN COMPOSITIONS

[75] Inventor: Justin C. Bolger, Needham, Mass.

[73] Assignee: Amicon Corporation, Lexington, Mass.

[21] Appl. No.: 326,560

[22] Filed: Jan. 24, 1973

Related U.S. Application Data

[63] Continuation-in-part of Ser. No. 635,394, May 2, 1967, abandoned, and a continuation-in-part of Ser. No. 736,605, June 13, 1968, abandoned, and a continuation of Ser. No. 53,304, July 8, 1970, abandoned.

[51] Int. Cl.$^2$ .............................................. C08G 2/30
[52] U.S. Cl. .................. 260/59 R; 260/2 N; 260/37 EP; 260/47 EN; 428/413
[58] Field of Search ................... 260/47 EN, 2 N, 59; 117/122; 428/413

[56] References Cited

U.S. PATENT DOCUMENTS 3,438,937  4/1969  Christie ........................... 260/47 EN
3,756,984  9/1973  Klaren et al. ............... 260/37 EP X

OTHER PUBLICATIONS

Lee et al., '57; Epoxy Resins; McGraw-Hill Book Co., Inc.; 1957; pp. 70, 73, 84, 87, 88.
Lee et al., '67; Handbook of Epoxy Resins; McGraw-Hill Book Co., Inc.; 1967; pp. 7-15, 7-16, 7-19, 8-15.

*Primary Examiner*—Lewis T. Jacobs

[57] ABSTRACT

Novel thermoplastic curing agents formed by reacting an imidazole compound with an epoxy resin, and with--optionally as a third reactant--polyfunctional proton-donating compounds like polybasic acids or phenolic novolac resins. The curing agents are extraordinary in that they are useful in formulating novel storeable, one-package, heat-curable epoxy resin-based compositions. Moreover, they react synergistically with known curing agents, most notably dicyandiamid. The cured materials are of excellent quality. Processes, whereby the various novel materials of the invention are made, are also described.

31 Claims, No Drawings

UNITARY CURABLE RESIN COMPOSITIONS

RELATED APPLICATION

This application is a continuation-in-part of U.S. Ser. No. 635,394, filed May 2, 1967 now abandoned, of Ser. No. 736,605, filed June 13, 1968 now abandoned, and is a continuation of Ser. No. 53,304 filed July 8, 1970, now abandoned.

BACKGROUND OF THE INVENTION

This invention relates to novel storable and curable epoxy resin compositions, to novel curing agents incorporated into said compositions, to processes for making and curing the aforesaid compositions, a process for making the aforesaid curing agents, and to articles prepared from the aforesaid compositions.

Imidazoles are widely used as curing agents for epoxy resins because products cured therewith generally exhibit highly desirable physical and chemical properties. However, like most tertiary-nitrogen-containing curing agents, imidazoles react very rapidly with epoxy resin systems, even at room temperatures. Illustrative of this fact is the information compiled in the following Table A wherein a number of imidazole compounds are evaluated with respect to the physical properties they contribute to an epoxy resin system cured with the imidazoles, with respect to their base strength, and with respect to their cure processing characteristics.

For this evaluation, all imidazoles were ground to 325 mesh before being stirred into the epoxy resin which is a liquid diglycidyl ether of bisphenol A having an epoxide equivalent weight of about 180 to 190 grams.

before a separately packaged epoxy resin can be converted into a cured material, and to avoid the probability that an incorrect amount of curing agent will be added to the resin by the ultimate consumer.

Previous attempts to solve these problems by producing such unitary systems have not been entirely satisfactory. This has been because of the highly catalytic nature of tertiary nitrogens in imidazole compounds. The problem has been to suppress this catalytic action without permanently destroying the thermal and chemical reactivity required for an eventual catalytic cure.

It is not sufficient to select a solid imidazole compound, or a solid tertiary amine compound having a relatively high melting point; such compounds do not provide satisfactory shelf life on the subsequent incorporation of these powdered solids into epoxy-containing formulations. For example, 2-methyl imidazole and other imidazoles, shown in Table I have relatively high melting points, > 140° C., yet cause a typical liquid epoxy resin (described herein below as Epoxy A) to gel overnight at 35° C. This effect was noted when the imidazole was ground to 200 mesh and incorporated at a weight ratio of 1:50 into the resin. Likewise, triethylene diamine, a solid tertiary diamine melting about 165° C. causes the gelling of such resins as Epoxy A when incorporated at a level of about 10% and left standing therein at 35° C. for 2 days.

Moreover, previous attempts to provide epoxy curing materials useful in curing processes carried out at relatively low temperatures, e.g., room temperature and slightly above, have involved the preparation of salts of imidazole compounds with such acids as acetic acid and lactic acid. Such compounds are disclosed in U.S. Pat.

TABLE A

| | CURE TIME AND SHELF LIFE OF EPOXY RESIN COMPRISING IMIDAZOLE COMPOUNDS AS CURING AGENTS | | | | | |
|---|---|---|---|---|---|---|
| Compound | Melting Point ° C | Boiling Point ° C | Curing Agent Base Strength $pK_A$ | lbs Curing Agent per 100 lbs Resin | Cure Time[1] at 140° C | Gel Time[2] at 25° C |
| Imidazole | 90 | 256 | 6.9 | 2.5 | 2 min. | 3 days |
| 1 Methyl- | −6 | 198 | 7.2 | 3 | 1.5 | 1 |
| 2 Methyl- | 146 | 265 | 7.9 | 3 | 1.5 | 2 |
| 2 Ethyl- | 86 | 265 | — | 3.5 | 1.5 | 3 |
| 2,4 Dimethyl- | 87 | 265 | — | 3.5 | 1.5 | 3 |
| 1 benzyl, 2 Methyl- | 45 | 240 | — | 6.3 | 2 | 3 |
| 2 Ethyl, 4 Methyl- | 44 | 293 | — | 4.0 | 1.5 | 3 |
| 2 Phenyl- | 145 | 340 | 6.4 | 5.3 | 2 | 3 |
| Benzimidazole | 170 | — | 5.5 | 6.0 | 3.5 | 6 |
| 2 Phenyl-2-Imidazoline | 103 | — | — | 6.0 | >10 | 6 |

[1]Time for a 2 gram drop of the mixture to harden on a plate heated at 140° C.
[2]Days for a 100 gram mixture to thicken to a gel at room temperature.

All of these imidazoles, irrespective of their melting or boiling point, cause rapid cure of a liquid epoxy system at temperatures on the order of 140° C. at low weight ratios of imidazole to epoxy resin. However, because they cause gelation at 25° C. none of these imidazole compounds can be used to provide a one-part system wherein the imidazole is intimately blended as a powder or as a liquid to provide a composition which is useful for an extended period of time. In general, such mixtures as shown in Table A gel within three to six days at only 25° C. and therefore are not suitable for use as storeable "one-package" unitary compositions.

Therefore, resin systems utilizing such curing agents are not adapted for storage as unitary systems comprising both the imidazole curing agent and an epoxy resin to be cured thereby. Unitary systems are highly desirable because they allow manufacturers and consumers of epoxy compositions to avoid more complex packaging means, to avoid the additional mixing step necessary Nos. 3,356,645 and 3,329,652. In the former patent, simple salts of imidazoles are formed. Such materials, on incorporation in epoxy resins, generally produce compositions of relatively short shelf life. For example, in U.S. Pat. No. 3,356,645 a pot life of only 5 days is obtained with 2-ethyl, 4-methyl imidazole acetate salts. In U.S. Pat. No. 3,329,652 these same salts are disclosed to form useful epoxy-curing initiators in anhydride-cured systems.

Until the instant invention, there has been no really effective epoxy curing agent which would be suitably used in unitary compositions such as liquid adhesives and potting compounds, solid fluid-bed coating compositions and other such materials. For real commercial value, a curable epoxy resin composition incorporating such curing agents should remain at workable viscosities more than 30 days at 25° C. and cure within 10 minutes at about 140° C., and such compositions can be prepared in accordance with the present invention.

Consequently, the principal object of the instant invention is to provide novel imidazole-type curing agents which are useful in making unitary curable epoxy resin compositions which satisfy the above criterion.

Another object of the invention is to provide imidazole-type curing agents which alone or together with other curing agents, can activate a rapid, uniform cure of epoxy resin compositions at relatively low temperatures and yet be extraordinarily resistant to gelling at room temperature for weeks or even months.

SUMMARY OF THE INVENTION

The above objects have been substantially achieved by providing as curing agents particular thermoplastic reaction products between imidazole-type compounds and polyfunctional epoxy resins. Moreover, these reaction products are found to have extraordinary and surprising advantages when formed with a third reactant, i.e., such polyfunctional proton-donor compounds as polycarboxylic acids and phenolic novolac resins.

It has also been discovered that the novel curing agents of the invention, most advantageously those formed from all three reactants described above, provide a synergistic effect when utilized in combination with such epoxy curing agents as dicyandiamid in curing epoxy resins.

Finally, it has been discovered that not only are the pot life, rate of cure, and susceptibility to cure at relatively low temperatures enhanced by use of the curing agents of the invention; but the properties of resultant adhesives, coatings and other products are markedly improved with respect to product uniformity, adhesion, mechanical properties such as modulus, tensile strength, heat deflection temperatures and the like.

The curing agents formed according to the invention are most conveniently thermoplastic solids melting between about 70° C. and 140° C. They can repeatedly be melted, then allowed to cool and resolidify and are not, like B-stage resins, subject to cure or cross-linking when heated. They are normally most useful in the form of finely-divided powders, e.g., powders capable of passing a 200-mesh screen. A most efficient form of the curing agent in many compositions is a powder closer to a micron in average diameter. Such curing agents when blended into an epoxy resin like the diglycidyl ether of bisphenol A to provide 0.03 to 0.12 mol of an imidazole compound (present in the form of the aforesaid thermoplastic reaction product) per epoxide equivalent (based on the last said resin) provide compositions retaining workable viscosities for extended periods of time. These mol ratios are intended to define the mol ratios of curing agent per epoxide equivalent of resin when the thermoplastic imidazole reaction products are used as sole curing agents. When dicyandiamid, acid anhydrides, or other curing agents are also present, the amount of thermoplastic imidazole reaction product may be advantageously reduced from those defined by the aforesaid mol ratios.

It has been found that if a curing agent powder possesses the above combination of room temperature stability and cure rate in a liquid epoxy resin, then such curing agents will also be useful for a variety of other purposes. The powder can, for example, be used to catalyze the cure of epoxy resin-acid anhydride mixtures, providing longer shelf stability then can tertiary amines such as (such as benzyldimethyl amine) commonly used for such purposes. The powders can also be melt blended, or dry blended, with solid epoxy resins to give solid products which cure rapidly at temperatures above 120° C., but which do not change appreciably in melting point for extended periods of room temperature.

Although, the mechanism of the reactions between imidazole compounds and epoxy resins is not perfectly understood, it is hypothesized that the desired reaction product is formed in the practice of the invention by an addition reaction between the oxirane group and the imino nitrogen, for example:

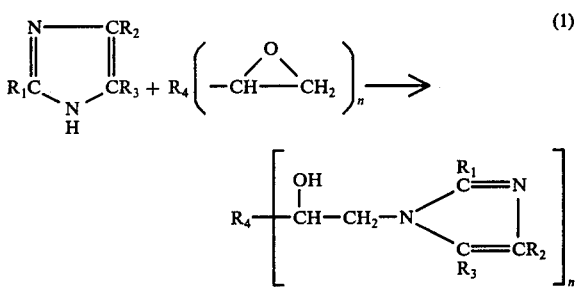

(1)

wherein $R_4$ is a polyvalent ether grouping, e.g., one derived from bisphenol A and epichlorohydrin such as

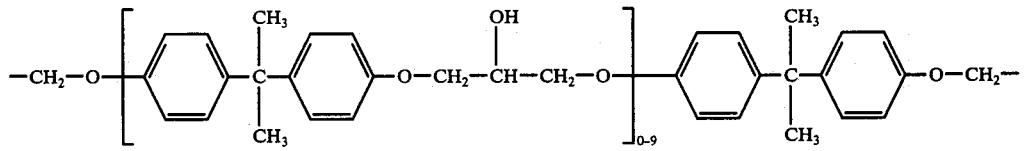

or from a phenolic novolac and epichlorohydrin as

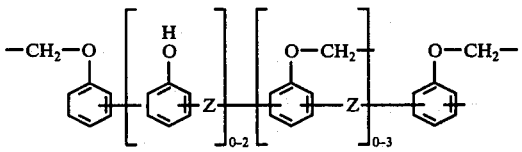

where Z is usually $-CH_2-$ or $-CH_2-O-CH_2-$.

An objective of this invention is to promote the above reaction at the expense of other competing reactions; for example the imidazole's pyridine nitrogen may catalyze the following epoxy-hydroxyl reaction.

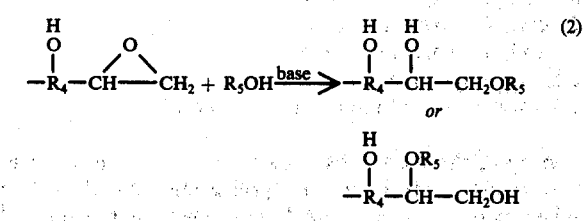

$R_5$ is an organic radical for example such as the radical of a product of Equation 1.

Similarly, it is believed that the reaction product of Equation 1 may further react with an additional epoxy resin to yield a product bearing an alkoxide ion.

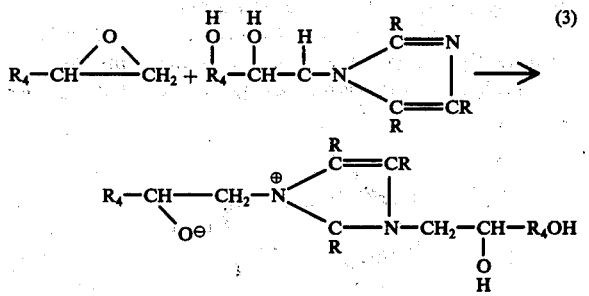

Moreover, in some of the particularly advantageous embodiments of the application wherein phenolic compounds are present, the following side reaction may also take place.

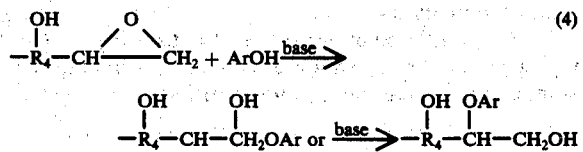

where Ar is an aryl radical.

If polybasic acids are present in the reaction systems, these may react with oxirane groups to form ester linkages via:

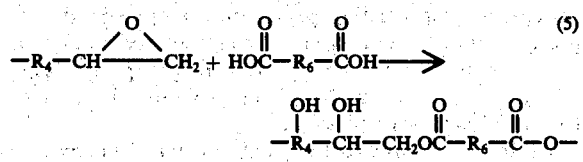

Equation (1) above is believed to yield the most desirable reaction products, i.e. thermoplastic solids melting within the range of about 70° to 140° C. Equations 2, 3, 4 and 5 tend to yield products resulting in either excessively crosslinked compounds, or excessively high melting curing agents, or to leave in the reaction mixture excessively high quantities of free (i.e. unreacted via equation 1) imidazole.

The reaction between the epoxy resin and the imidazole compound (and with the polycarboxylic acid or phenolic novolac resins, when used) to form the curing agent of the present invention can be carried out by mixing the ingredients together in the desired proportions, either with or without a suitable volatile solvent such as dimethyl formamide. If a solvent is used, it is removed by volatilization before mixing the curing agent with the epoxy resin composition to be cured. It is desirable, particularly when no solvent is used, to heat the resin to an elevated temperature of at least 50° C. in order to facilitate the mixing and to control the uniformity of the reaction. The reaction is exothermic and the temperature of the reaction mixture consequently may rise to 250° C. or even higher during the reaction. It may be desirable, after the temperature of the mixture begins to drop, to continue heating in order to ensure completion of the reaction. The reaction is complete when the product no longer changes in properties such as melting point upon further heating.

The use of phenolic novolac resins and the use of polybasic organic acids as reactants with the epoxy resin and imidazole compounds in forming the curing agents of the invention is highly advantageous. Resultant curing agents increase the useful shelf life of epoxy resin compositions into which they are incorporated by a factor of 5 or more. This improvement is believed to be achieved by the formation of an acid-base complex or polysalt between the product of Equation 1 (which is polycationic in character because of the plurality of pyridine nitrogens in each molecule) and the novolac phenolic resin or polybasic acids (which are polyanionic, i.e., proton donative, in character because they contain more than one ionizable hydrogen per molecule).

The curing agents which satisfy the above criteria can, it will also be shown in this disclosure, also be used in combination with dicyandiamid to provide shelf storage stability for periods in excess of 3 months at 25° C. and also to provide the advantage of curing at much lower temperatures and in much shorter times than epoxy resin compositions where dicyandiamid is the sole curing agent.

Polyfunctional epoxy resins which are particularly advantageous for reaction with imidazole compounds to provide curing agents according to the invention are those having an epoxide equivalent weight of from about 170 to about 2000 and, preferably, melting below about 140° C.

It is generally advantageous to use sufficient epoxy resin in forming the curing agent to provide a ratio of oxirane groups to imidazole compound molecules of between 1:1 and 2:1. Larger relative quantities of oxirane groups will result in a thermosetting, or high melting reaction product excessively difficult to activate with heat. Smaller relative quantities of oxirane groups will tend to result in a reaction product which melts at a temperature below about 70° C. or which contains a high proportion of residual imidazole monomer, and which thereby tends to reduce shelf life of epoxy compositions into which it is incorporated. Oxirane-imidazole ratios of from about 0.8:1 to about 2.2:1 are suitable when phenolic resins or polybasic acids are present, although ratios from 1:1 to 2:1 are preferred.

The amount of polycarboxylic acid or of phenolic novolac resin (polyphenol), if any, which is used along with the epoxy resin to react with the imidazole compound to form a curing agent can be as much as 1.5 acid equivalents (the phenolic hydroxyl groups being acidic) per molecule of the imidazole compound. Good results are obtained when the amount of polycarboxylic acid or of phenolic novolac resin is from 0.7 to 1.5 acid equivalent per mole of imidazole compound, the optimum being approximately a 1:1 ratio between acid equivalents of the polycarboxylic acid or polyphenol and moles of imidazole compound.

When dicyandiamid is also present in an epoxy resin composition in combination with the curing agent of the present invention, the dicyandiamid can be used in amounts up to 25 times the weight of the curing agent. Good results are obtained when the weight ratio of dicyandiamid to curing agent is from 0.04:1 to 25:1, optimum results being obtained when the ratio is from 0.3:1 to 1.5:1.

The various reactants are chosen and reacted so that the melting point of the resultant curing agent will be above the storage temperature but below the intended curing temperatures of the compositions in which the curing agents are to be used. As indicated above, a range of melting points of from about 70° C. and 140° C. is appropriate for most commercial applications.

When small particle-fillers are present in the composition during the imidazole-epoxy reaction to form the curing agent of the invention, it is usually preferable that the quantity of filler be not greater than about 10 times the weight of total resin in the composition. Among the fillers which may be suitably used are carbon black, metal powders like aluminum powder, the various metal oxides like silica, titania and alumina; and clays such as kaolin, silicates such as magnesium and aluminum silicate and the like. Fibrous fillers such as asbestos, and glass may also be incorporated in compositions prepared according to the invention.

Among the polycarboxylic acids which may be suitably reacted with an imidazole compound and an epoxy resin to form an advantageous class of curing agents according to the invention are chlorendic acid; the acids of the formula

HOOC— (CH$_2$)$_n$—COOH including adipic acid, succinic acid, glutaric acid, pimelic acid, suberic acid, sebacic acid and the like; maleic acid, itaconic acid, phthalic acid, isophthalic acid, terphthalic acid, trimellitic acid, pyromellitic acid, and other such aromatic polybasic acids, as well as hydrolyzed copolymers of maleic anhydride with alkenes or alkadienes. Those skilled in the art, on reading this list, will no doubt be able to select from a large number of other polybasic acids should they so desire.

Imidazole compounds most suitable for use in the instant invention include compounds containing the characteristic imidazole five-membered heterocyclic ring such as the following:

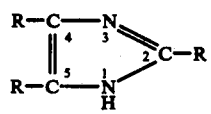

wherein R may be hydrogen, or a substituent selected from alkyl, (including cycloalkyl), alkenyl, aryl, or halo (e.g., chloro or bromo) or other non-interfering inert substituent groups. The R groups need not be identical to each other. Among such compounds are:

imidazole,
2-ethyl, 4-methyl imidazole,
2-methyl imidazole,
4,5 dimethylimidazole,
2,4,5-trimethylimidazole,
2 propyl, 4,5-dimethylimidazole
2-cyclohexyl, 4-methyl imidazole,
2-butoxy, 4-allyl imidazole,
2-octyl, 4 -hexyl imidazole,
2-ethyl, 4-phenyl imidazole,
2-butyl, 5-methyl imidazole
2,5 chloro, 4-ethyl imidazole, and the like.

Among the inert substituents which can be present besides alkyl substituents are aryl groups which themselves may carry non-interfering substituents such as alkyl or halogen. It is most advantageous that the aryl or alkyl or alkenyl groups substituted on the imidazole ring have 12 carbons or less. The most preferred compounds because of their relative solubility and reactivity are thse in which the R groups are hydrogen or alkyl or phenyl substituents having an accumulative carbon-atom total of from 1 to 8 carbon atoms.

There may also be used as the imidazole compound in forming the curing agent of the present invention a benzimidazole compound having the following structure:

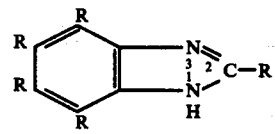

The various groups designated as R in the foregoing formula need not all be the same, but each R is defined in the same way as the R groups in the preceding two paragraphs. Benzimidazole itself is an entirely suitable material for use in forming novel curing agents according to the invention.

The imidazole compounds useful in forming the curing agent of this invention also include 2-imidazoline compounds having the following structure:

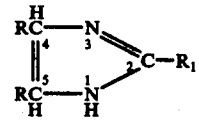

The R groups in this structure are defined just as the R groups in the preceding paragraphs. However, the $R_1$ group cannot be hydrogen but must be alkyl or aryl or other non-interfering inert substituent groups, the alkyl and aryl groups preferably being selected from those having 12 carbons or less.

1-substituted imidazoles, such as the 1-benzyl, 2-methyl imidazole listed in Table A, have been demonstrated to be inoperable in the instant invention.

Although the above numbering of ring atoms has assigned position "1" to the imino nitrogen and position "3" to the pyridine nitrogen, it is to be recognized that imidazole compounds are stabilized by a three-electron resonance system and are tautomeric as follows:

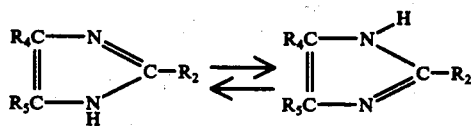

Despite the presence of two nitrogen atoms in the ring, the above "imidazole compounds" are all monoacid bases —i.e., the imino hydrogen is an acidic proton and its presence is believed to be necessary for the addition reaction underlying the practice of the instant invention.

The term "inert" as used in the description of these compounds means groups or radicals which do not cause major changes in the solubility characteristics of the imidazole compound in the mediums for which it is intended, (except, of course, within temperature ranges where increased solubility would be desirable and result in faster and/or more uniform cures), do not inhibit the desired reactions because of steric hindrance or other chemical interference, and do not affect the compound with respect to temperature stability so as to cause it to have a melting point outside any useful temperature range.

The curing agents of the invention may be used in curing a wide variety of epoxy resins in addition to those described in the detailed numbered examples. Among such resins are:

1. The epoxidized ester of the polyethylenically unsaturated monocarboxylic acids, such as epoxidized linseed, soybean, perilla, oiticica, tung, walnut and dehydrated castor oil, methyl linoleate, butyl linoleate, ethyl 1,12-octadecadienoate, butyl 9,12,15-octadecatrienoate, butyl oleostearate, monoglycerides of tung oil fatty acids, monoglycerides of soybean, sunflower, rapeseed, hempseed, sardine, or cottonseed oil, and the like.
2. The epoxidized esters of unsaturated monohydric alcohols and polycarboxylic acids, such as, for example, di(2,3-epoxybutyl) adipate, di(2,3-epxoybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) di phenyldicaboxylate, di(3,4-epoxyheptyl) sulfonyldibutyrate, tri(2,3-epoxybutyl) 1,2,4-butanetricarboxylate, di(5,6-epoxypentadecyl) tartrate, di(4,5-epxoytetradecyl) maleate, di(2,3-epoxybutyl) azelate, di(3,4-epoxybutyl) citrate, di(5,6-epoxyoctyl) cyclohexane -1,2 di-carboxylate, di(4,5-epoxyoctadecyl) malonate.
3. Epoxidized esters of unsaturated alcohols and unsaturated carboxylic acids, such as 2,3-epoxybutyl- 3,4-epoxypentanoate, 3,4-epoxyhexyl, 3,4-epoxypentanoate, 3,4-epoxycyclohexyl- 3,4- epoxycyclohexanoate, 3,4-epoxycyclohexyl - 4,5-epoxyoctanoate, 2,3-epoxycyclohexylmethyl epoxycyclohexane carboxylate.
4. Epoxidized derivatives of polyethylenically unsaturated polycarboxylic acids, such as, for example dimethyl 8,9,12,13- diepoxyeicosanedioate, dibutyl 7,8 11,12-diepoxyoctadecanedioate, dioctyl 10,11-diethyl-8,9,12,13-diepoxy-eicosanedioate, dihexyl 6,7,10,11- diepoxyhexadecanedioate, didecyl 9-epoxy-ethyl - 10,11-epoxyoctadecanedioate, dibutyl 3- butyl - 3,4,5,6-diepoxycyclohexane - 1,2-dicarboxylate, dicyclohexyl 3,4,5,6-diepoxycyclohexane - 1,2-dicarboxylate, dibenzyl 1,2,4,5- diepoxycyclohexane-1,2-dicarboxylate and diethyl 5,6,10,11-diepoxyoctadecyl succinate.
5. Epoxidized polyesters obtained by reacting an unsaturated polyhydric alcohol and/or unsaturated polycarboxylic acid or anhydride groups, such as for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.
6. Epoxidized polyethylenically unsaturated hydrocarbons, such as epoxidized 2,2-bis (2-cyclohexenyl) propane, epoxidized vinyl cyclohexene and epoxidized dimer of cyclopentadiene.
7. Epoxidized polymers and copolymers of diolefins, such as butadiene. Examples of this include, among others, butadiene-acrylontrile copolymers (nitrile rubbers), butadiene-styrene copolymers and the like.
8. Glycidyl-containing nitrogen compounds, such as diglycidyl aniline and di- and triglycidylamine.
9. Particularly useful epoxy resins for utilizing the curing agents of the invention are the glycidyl ethers and particularly the glycidyl ethers of polyhydric phenols and polyhydric alcohols. The glydicyl ethers of polyhydric phenols are obtained by reacting epichlorohydrin with the desired polyhydric phenols in the presence of alkali. Polyether A and Polyether B described in U.s. Pat. No. 2,633,458 are good examples of polyepoxides of this type. Other examples include the polyglycidyl ether of 1,1,2,2-tetrakis (4-hydroxyphenyl) ethane (epoxy value of 0.45 eq./100 g. and melting points 85° C.), polyglycidyl ether of 1,1,5,5-tetrakis (hydroxyphenyl) pentane (epoxy value of 0.514 eq./100 g.) and the like and mixtures thereof. Other examples include the glycidated novolacs as obtained by reacting epichlorohydrin with phenolic novolac resins obtained by condensation of formaldehyde with a molar excess of phenol or cresol.

As will be understood from a reading of this specification most of the above-listed epoxy resins—if selected for appropriate epoxy content and molecular weight to have an epoxide equivalent weight from about 170 to about 2000—can also be used as the epoxy resin to react with the imidazole compound for forming the curing agents of the invention. All of the foregoing epoxy-containing materials, liquids as well as solids, are known in the art as epoxy resins and are so designated herein.

Normally, it is desirable to use the curing agents of the invention in the form of finely-divided powders. A smaller particle size will usually allow the use of a somewhat smaller quantity of curing agent in a given system. However, this presumes that the system to be cured is subjected to a mixing procedure suitable for achieving an optimum dispersion of the curing agent throughout the system to be cured. A preferred range of particle size is from 1 to 30 microns; however, in many resin systems average particle diameters from 30 to 100 microns or even larger have been found to be suitable for use. Nevertheless, the optimum physical and chemical properties of cured systems are usually achieved with curing agents in the 1 to 30 micron range.

Although, the principal use of the instant invention is presently in conjunction with liquid epoxy resins, those skilled in the chemical arts will understand that these materials can also be used suitably as curing aids in vicinal episulfide polymer systems, and that indeed vicinal episulfide analogs may be used in forming the curing agents according to the invention.

Moreover, the curing agents of the invention and resin formulations into which they are incorporated can form useful solids, i.e., thermoplastic materials which may also be cured at higher temperatures.

The phenolic novolac resins which are advantageously reacted with an imidazole compound and epoxy resin to form particularly advantageous curing agents according to the invention are the so-called "two-step-resins" or phenolic novolacs containing at least two phenolic groups per molecule, usually obtained by use of acidic catalysts by reacting phenol and formaldehyde in a mol ratio greater than 1 to 1. A typical formula of such a material is

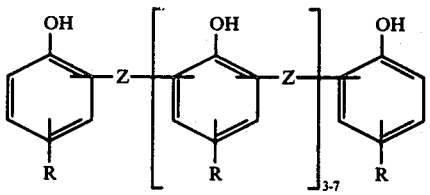

where R is hydrogen or an alkyl group and Z is —CH₂— or —CH₂—O—CH₂— or the like. Those skilled in the art, however, will be able to select a large number of other phenolic novolac resins based on the disclosure contained in this paragraph and elsewhere in the specification.

DESCRIPTION OF TYPICAL EMBODIMENTS

The following working examples are presented to illustrate the invention and are not intended to be limiting. Various changes in reactants, in relative proportions of reactants, reaction conditions and the like are contemplated beyond those specifically set forth below and those skilled in the art, on reading this disclosure, will be able to adapt such conditions to the solution of any particular application. The ethers of bisphenol A are formed with epichlorohydrin unless otherwise indicated.

The following table is presented as a guide to commercially available epoxy resins which include those used in the following working examples. In most cases the particular resin used in the working example has been somewhat more narrowly defined than the materials in the following table:

| Grade | Epoxide Equivalent Weight | Epoxy Designation |
|---|---|---|
| Epon 828 | 175 – 210 | Epoxy A |
| Epon 834 | 225 – 290 | Epoxy B |
| Epon 1001 | 450 – 525 | |
| Epon 1004 | 870 – 1030 | |
| Epon 1007 | 1650 – 2050 | |
| Epon 1009 | 2400 – 4000 | |

EXAMPLE 1

Example 1 illustrates that, in curing agents comprising only imidazole and epoxy resin reactants, it is advantageous to use a ratio of oxirane groups to imidazole molecules of between 1:1 and 2:1. Larger relative quantities of oxiranyl groups will generally result in a high melting reaction product excessively fifficult to activate with heat; smaller relative quantities of oxirane groups will tend to result in a reaction product which is activated at undesirably low temperatures and which tends to reduce shelf life of epoxy compositions into which it is incorporated.

A quantity of 58.6 grams of an epoxy resin, a liquid diglycidyl ether of bisphenol A having an epoxide equivalent weight of about 260 to 290 grams (henceforth called Epoxy B), was warmed to 50° C. and then blended with 41.4 grams of 2-ethyl, 4-methyl imidazole to yield a liquid mixture having about 0.6 epoxide equivalent per mole of imidazole. This ratio, which is identical to the ratio of oxirane groups to imidazole molecules, is designated as "n" below. The mixture was allowed to stand for 16 hours at room temperature, and then heated for 72 hours at 80° C. At the same time four other blends of these same compounds were made by the same procedure, except that weight ratios of reactants were used sufficient for giving a series of values of n equal to 1.0, 1.5, 2.0 and 3.0 epoxide equivalents per mole of imidazole. In each case a brittle solid was produced.

All of these solids were first tested for melting point and then ground to pass a 200 mesh screen. Each of these five samples of screened powder were then intimately dispersed into pastes with more liquid epoxy resin (a liquid diglycidyl ether of bisphenol A having an epoxide equivalent weight of about 180 to 190 grams, henceforth called Epoxy A) at a proportion to give 4 parts by weight of the imidazole per 100 parts of liquid epoxy resin. A portion of each of the five resulting pastes was stored in an oven maintained at 35° C. to measure gel resistance, i.e., time to gel at 35° C. A second portion of each of the five pastes was spread, in a 10 mil thick film, on metal plates heated to 160° C. This second test was carried out to determine the speed, uniformity and quality of cure. For control purposes, these products were compared to a simple liquid blend of 4 parts of 2-ethyl, 4-methyl imidazole in 100 parts of Epoxy A. The results of this testing are summarized in Table 1.

Table I

| | Curing Agent | | Curable Composition | | |
|---|---|---|---|---|---|
| n | Melting Point | Plastic State | Days to Gel (35° C) | Speed of Cure at 160° C | Appearance of Cured Film at 160° C |
| Control | — | liquid | <1 | fast | uniform |
| 0.6 | 80° C | thermoplastic | 3 days | fast | uniform |
| 1.0 | 100° C | " | 4 days | fast | uniform |
| 1.5 | 110° C | " | 10 days | fast | uniform |
| 2.0 | 125.° C | " | >14 days | fast | slightly uneven |
| 3.0 | — | thermoset | >21 days | fast | uneven cure |

Thus, in the above series of tests, only those samples with n values greater than 1.5 yielded pastes having stability characteristics clearly superior to simple mixtures of Epoxy Resin A and 2-ethyl, 4-methyl imidazole. Only products of n equal to about 2 or less cured satisfactorily.

EXAMPLE 2

This example is set forth to demonstrate that the addition of a polyfunctional phenolic novolac resin to an imidazole-epoxy reaction system will result in curing agents which will allow greatly prolonged, shelf-life in compositions in which they are incorporated.

Epoxy B and 2-ethyl, 4-methyl imidazole were compounded together with a 50% solution, in ethanol/toluene, of a solid novolac resin formed by the reaction of formaldehyde with a molar excess of cardol, an alkyl-substituted phenolic compound derived from cashew-nut oil. Henceforth we shall refer to this phenolic resin as Phenolic Resin B. The melting point of this resin is about 90° to 100° C. Such a novolac resin is sold under the trade designation Durez 12686.

Various compositions of the aforesaid three-component system were prepared as shown in Table II. Portions are in parts by weight.

Table II

| Sample | Epoxy A | Imidazole | Phenolic Resin B |
|---|---|---|---|
| 3-a | 70.3 | 29.7 | 0 |
| 3-b | 45.6 | 19.3 | 35.1 |
| 3-c | 33.8 | 14.3 | 52.0 |
| 3-d | 22.0 | 9.4 | 68.4 |

Each of the samples listed in Table II have an $n$ value of 1, but it will be seen that various proportions of phenolic resin were added to each sample. Each sample was spread out in a shallow pan and then heated for 48 hours at 80° C to evaporate solvent and to cure the mixture. The resulting solid was pulverized to pass 200 mesh, tested for melting point and finally was mixed with Epoxy A to measure gel stability at 35° C and curing characteristics at 150° C. The results are set forth in Table III below:

Table III

| Curing Agent | | Curable Composition | | | |
|---|---|---|---|---|---|
| Curing Agent | Melting Point | Grams Curing Agent per 100 grams Epoxy A | Time to Gel at 35° C | Cure Rate (minutes to harden) at 150° C | Condition of film cured at 150° C |
| Sample 3a | 100° C | 15 | 4 days | 10 | excellent |
| Sample 3b | 77° C | 23 | 30 days | 10 | excellent |
| Sample 3c | 73° C | 31 | 12 days | 15 | partly heterogeneous |
| Sample 3d | 65° C | 48 | 1 day | 20 | non-uniform |

Infrared analysis of thin films of Samples 3b and 3c indicate that some reaction products were formed according to Reactions 2 and 4 set out earlier in the specification.

By such tests as carried out in instant Example 2, it has been determined that the presence of solid phenolic novolac resins in the curing agent could enhance the shelf life of the unitary epoxy compositions of the invention. Advantageously, for the reactants shown in Table III the amount of phenolic resin in the curing agent should be less than about twice the amount of epoxy resin. Otherwise, a significant reduction in shelf life appears under most conditions. Note, however, that this restriction on the amount of phenolic material does not apply if the phenolic material is added separately, e.g. if a powdered curing agent plus a powdered phenolic novolac resin (including phenolic dimers such as Bisphenol A) are added separately to Epoxy A.

EXAMPLE 3

A stiff paste containing 200 grams of a 15-micron diameter silica and 40 grams of water was formed by mixing the ingredients in a dough mixer.

Separately, a syrup of 50 grams Epoxy B; 44 grams of 2-ethyl, 4-methyl imidazole; and 8 grams of toluene was prepared, added immediately to the silica paste and mixed thoroughly therewith. Sixty grams of a phenolic novolac resin was dissolved in 60 grams of ethanol and mixed with the silica-epoxy mixture. This phenolic resin, made by reacting an excess of phenol with formaldehyde and henceforth called Phenolic Resin A, had a melting point of 90° C to 100° C. Such a resin as Phenolic Resin A is sold under the trade designation BXRP 2764.

After 30 minutes of additional mixing, the resulting materials was spread out in a shallow pan, allowed to stand at about 25° C, and heated for about 48 hours at 80° C. The resulting reaction product was ground to form a powder passing through a 200 mesh screen.

The following recipe was prepared using the aforesaid powder as the curing agent therein:

| | Parts |
|---|---|
| Curing Agent | 24.0 |
| Epoxy A | 100.0 |
| Aluminum (325 mesh) | 150.0 |
| Pyrogenic silica | 2.7 |

The adhesive paste resulting from the mixture of the foregoing ingredients showed no gelation after 30 days at room temperature. Films, 10 mils in thickness, cured uniformly in less than 5 minutes at 200° C. Adhesive bonds, between aluminum and steel strips, formed by a 10-minute cure at 200° C and 10 mils thick gave tensile shear values above 2000 psi and 90° peel strengths above 6 lbs per inch.

A second paste adhesive was prepared from the following recipe and using the same curing agents, by first milling the powdered polyanhydride into Epoxy A and then stirring in the aluminum filler and curing agent:

| | Parts |
|---|---|
| Curing Agent | 3.0 |
| Epoxy A | 100.0 |
| Aluminum (325 mesh) | 180.0 |
| Polyazelaic polyanhydride | 80.0 |

A third paste adhesive was prepared from a recipe similar to that from which the second paste was prepared, excepting that the curing agent was omitted therefrom.

The second paste cured in 10 minutes at 300° F; the third paste did not cure after 30 minutes at 300° F. This illustrates the fact that small quantities of curing agents prepared according to the invention serve as base catalysts to accelerate the reaction between the epoxy resin and such co-reactants as acid anhydrides.

Moreover, the second paste yielded adhesive bonds between aluminum and steel strips, the bonds having 3000 psi tensile shear strength and 15 lbs per in. peel strength (90° peel). These results were obtained after a 10-minute cure at 400° F.

The second paste was gel-free for at least three months at room temperature.

Another demonstration of the utility of curable compositions prepared according to the invention was carried out by forming a powder mixture containing 40 grams of the curing agent and 250 grams of solid cresol novolac epoxy resin with a melting point of about 95° C. This resin, henceforth called Epoxy E, has about 3 to 6 benzene rings per molecule and an epoxide equivalent weight of about 200 to 300 grams. Such a resin is available under the trade designation ECN 1299 from Union Carbide Corporation.

The resulting powder was fluidized in a laboratory fluid-bed coating unit. Steel and aluminum strips, preheated to 450° F., were inserted into the fluid bed and were consequently coated with smooth, uniform 20-mil thick coatings. After a two-hour cure at 300° F., these coatings were tested and discovered to have excellent abrasion resistance, impact strength, thermal stability and chemical resistance to 10% sulfuric acid solutions.

EXAMPLE 4

Epoxy Resin B (114 grams) was dissolved in acetone to yield an 80% solution. Separately, Phenolic Resin B (86 grams) was dissolved in acetone to yield a 60% solution. One hundred and forty four grams of each of these solutions were added to a one-quart vessel equipped with a propeller stirrer, and mixed at an initial temperature of 30° C. To this solution was then added 48 grams of 2 ethyl, 4 methyl imidazole. Agitation was continued and an exothermic reaction began within about 3 minutes, with the peak temperature of 38° C being reached in approximately 8 minutes. After an additional 30 minutes of mixing, the solution was cast into shallow trays to form a layer 0.125 inches thick. These trays were then allowed to stand undisturbed overnight (16 hours) at 25° C, and were then inserted into an oven, at 120° C for 2 hours, to evaporate residual acetone. A dark, brittle resin with a melting point of 85° C was thus obtained and then ground to pass a 325 mesh screen.

A low viscosity casting composition was prepared by stirring 35 parts of 325 mesh silica flour into 100 parts of Epoxy Resin A. After a smooth paste had been obtained, 18 parts of the above curing agent were stirred into the paste. This mixture showed no significant increase in viscosity, but rather remained a workable fluid paste for over 90 days at 25° C. A second sample of this paste remained a workable fluid after 14 days storage at 35° C. These pastes, however, cured rapidly at 150° C becoming hard and resistant to attack by strong solvents, acids, and bases after only 2 minutes. Indeed, they cured rapidly at all temperatures over 110° C.

EXAMPLE 5

Epoxy Resin B (493 grams) was warmed to 60° C and poured into a round bottom flask equipped with a horseshoe stirrer and a heating mantle. Agitation was started, and 134 grams of 2 methyl imidazole in coarse powder form were poured into the vessel. Within 2 minutes, the temperature began to rise, and the imidazole powder appeared to begin to dissolve in and react with the epoxy resin. After 4 more minutes, a peak exotherm of 250° C was reached. Thereupon the temperature fell to about 210° C in 6 more minutes, at which time the heating mantle was turned on to maintain the mixture at 210° C with continued good agitation. After 1 hour at 210° C, 373 grams of Phenolic Resin B in the form of a coarse ground powder were added to the mixture. This phenolic addition was, however, done slowly and incrementally over a 30-minute period to permit each addition to dissolve before adding the next increment. Finally, this molten mixture was allowed to continue mixing, at approximately 210° C. Seventy minutes after this addition of the phenolic began agitation was stopped, the heating mantel was removed, and the reaction mixture was allowed to cool to room temperature. The product was a dark amber glassy thermoplastic resin, having a melting point of about 90° C. This resin was then ground to pass 400 mesh for use as a curing agent.

A silica filled casting compound was prepared by mixing 50 grams of 400 mesh silica flour into 100 grams of Epoxy Resin A. To this mix was added 12 grams of the curing agent produced above to form a paste which was viscosity stable for longer than 90 days at room temperature. This paste cured rapidly at all temperatures above 250° F, solidifying to a hard solvent resistant thermoset, for example, after 2 minutes at 280° F.

EXAMPLE 6

The following example is presented to show the suitability of curing agents of the invention in epoxy-anhydride compositions. The curing agent utilized is that described in Example 5.

Three identical pastes were prepared, each consisting of 100 grams of Epoxy Resin A, 80 grams of methyl Nadic anhydride, and 180 grams of 325 mesh silica flour. One of these pastes was left uncatalyzed. To a second was added one gram of the powdered curing agent of Example 5. To the third was added one gram of 2,4,6 tris (dimethyl amino methyl) phenol (DMP-30) which is a tertiary amine compound conventionally used to accelerate epoxy-anhydride reactions. The first two pastes remained fluid over 21 days at 25° C, whereas the third paste containing the DMP-30 gelled in 8 days at 25° C. Fifty gram samples of each of the three pastes were heated to 120° C for 2 hours. Pastes 1 and 3 had hardened to a solid at this temperature after this time, whereas the second paste which did not contain an accelerator remained a viscous liquid. The first and third pastes were then post-cured for an additional four hours at 150° C, after which the Shore D hardnesses were measured both at room temperature and at 150° C. The Shore D hardness of both castings was 88 at room temperature, but the hardness of the sample accelerated with the curing agent of Example 5 was 86 at 150° C, whereas the hardness of the sample accelerated with DMP-30 was only 72 at 150° C. This shows that the curing agents produced via this invention not only offer advantages in shelf life over to conventional tertiary amine accelerators, but can also produce materials having superior rigidity and distortion resistance at elevated temperatures.

It will be appreciated that the curing agents of the invention can only be used to provide one-package epoxy anhydride compositions if the epoxy-anhydride mixture itself in the absence of accelerator does not thicken or gel upon storage. Table V shows that a variety of organic carboxylic acid anhydrides can be mixed with Epoxy Resin A, in various proportions, to form relatively stable mixtures at room temperatures in the absence of tertiary amines or other accelerators. Table V also shows that upon adding conventional accelerators such as benzyldimethyl amine (BDMA), DMP 30 or the boron trifluoride amine complex ($BF_3MEA$), the resultant mixtures generally thicken rapidly on standing at room temperature. The curing agents of the type disclosed in Examples 3, 4 and 5, however, when used at the level of approximately 1 part per 100 of Epoxy Resin A, provide mixtures which cure rapidly at temperatures above 100° C. and which also show essentially the same viscosity after 10 days at 25° C., as do the same epoxy-anhydride mixtures without accelerator.

Advantageously the anhydrides can either be incorporated into the curable compositions in quantities related to the mols of imidazole present in the curing agent or to the total epoxide equivalents in the epoxy resin composition. That is, part of the cure may be provided by the anhydride, with the remainder provided by the imidazole compound; more directly, it may be stated that when anhydrides are used as curing agents in the system, the amount of imidazole effective to catalyze the cure can be calculated as follows:

$N_1 = X(N_2 - N_3)$ where $N_1$ = mols of imidazole groups in curing agent to be incorporated $N_2$ = epoxide equivalents in total curable compositions $N_3$ anhydride group equivalents in curable composition (from 0 to $0.95N_2$)

X = constant from 0.01 to 0.08

However, the maximum amount of anhydride used in the composition is not limited by the foregoing equation; it can be as much as 150% of $N_3$ as defined above.

Other anhydride combinations suitable for use in this invention, in addition to polyazelaeic polyanhydride (Example 3) and Nadic methyl anhydride, hexahydrophthalic anhydride and dodecenyl succinic anhydride (Example 5), include polysebacic, chlorendic, trimellitic, phthalic, maleic, succinic and tetra hydrophthalic anhydride, pyromellitic dianhydride, and the like.

If the anhydride is a solid at room temperature, it may be mixed or milled into the liquid epoxy resin in fine powder form.

TABLE V
VISCOSITY STABILITY OF EPOXY-ACID ANHYDRIDE MIXTURES

| Acid Anhydride (parts by wt) | Parts Epoxy A | Parts Accelerator | Viscosity (cps) Initial | After 10 days at 25° C |
|---|---|---|---|---|
| 50 MNA | 100 | None | 3800 | 5200 |
| 67 MNA | 100 | None | 2600 | 5500 |
| 90 MNA | 100 | None | 2200 | 3000 |
| 77 DDSA | 100 | None | 2100 | 4900 |
| 100 DDSA | 100 | None | 1700 | 4300 |
| 39 HHPA | 100 | None | 2100 | 6800 |
| 57 HHPA | 100 | None | 1400 | 4600 |
| 90 MNA | 100 | 1.5 BF$_3$MEA | 3000 | >50,000 |
| 90 MNA | 100 | 1.5 BDMA | 3300 | >50,000 |
| 90 MNA | 100 | 1.0 DMP-30 | 3500 | >50,000 |
| 70 HHPA | 100 | 1.5 BDMA | 3400 | >50,000 |
| 70 HHPA | 100 | 1.5 BF$_3$MEA | 2200 | >50,000 |
| 100 DDSA | 100 | 1.5 BDMA | 2100 | >50,000 |

DDSA = Dodecenyl Succinic Anhydride
HHPA = Hexahydrophthalic anhydride
MNA = Methyl Nadic Anhydride
BDMA = Benzyl dimethyl amine
DMP-30 = 2,4,6 Tris (Dimethyl amino methyl) Phenol
BF$_3$MEA = Boron Trifluoride Monoethyl amine

EXAMPLE 7

This example is presented to show the utility of the curing agents of the invention to form novel thermoplastic articles useful in forming various adhesive bonds.

In one case, 200 grams of a coarsely ground bisphenol A type epoxy resin (Epoxy Equivalent weight of about 450) were dry blended with 600 grams of 325 mesh silica and 6 grams of the curing agent of Example 5. This blend was then ground to pass a 325 mesh screen and pressure compacted into dense tablets ca. 5 gms each in weight. These tablets could be used as transfer molding pellets, showing essentially no change in flow characteristics after 10 weeks at 25° C, but curing in less than 10 minutes at 300° F. A similar powder was prepared by grinding a mixture of 200 parts of the bisphenol-type epoxy resin, of epoxide equivalent weight of about 1,600, with 20 parts 325 mesh silica flour and 4 parts of the curing agent of Example 5 to pass 200 mesh, and using this powder in a fluidized bed to coat metal surfaces heated to between 200° F and 450° F. Such coatings, 10 mils thick on ½ inch diameter steel rods, developed excellent impact and electrical properties after a 30 minute post cure at 320° F.

EXAMPLE 8

The process for making a curing agent as set forth in Example 5 was repeated except that the reactant ratios were 312 grams of Epoxy Resin B, 84 grams of 2 methyl imidazole, and 571 grams of Phenolic Resin B. When 16 grams of the resultant powdered curing agent were mixed with 100 grams of Epoxy Resin A, a paste was produced which remained workable for over 20 days at 40° C, and which cured to a hard solid in 3 minutes at 290° F. This shows that higher proportions of phenolic resin may be used than were shown in Example 4.

Similarly, the procedure of Example 5 was repeated, substituting Phenolic Resin A for Phenolic Resin B at the same weight proportion. This curing agent, used at a ratio of 12 parts per 100 parts of Epoxy Resin A, gave pastes which were stable for over 14 days at 35° C but which cured rapidly at all temperatures above 250° C.

Finally, the process of Example 5 was repeated except that the phenolic resin was omitted entirely, — i.e. the total time, temperature and mixing cycle of Example 5 was repeated except that no phenolic was added to the expoxy resin — 2 methyl imidazole mixture. The resulting solid was pulverized to pass 400 mesh and designated as curing agent X-2, to distinguish this from the product of Example 5 (designated X-1). Three Molding Compounds (samples a, b, and c) were prepared by dry blending 100 grams of a solid epoxy resin which is essentially the tetra glycidyl ether of 1,1,2,2, tetrakis (4hydroxy phenyl) ethane, with 1 gram of calcium stearate, 150 grams of 325 mesh silica flour, 40 grams of pulverized Phenolic Resin A and the following amounts of curing agents:

| a) 2 methyl imidazole (control) | 1 gram |
| b) curing agent X-2 | 2.5 grams |
| c) curing agent X-1 | 2.5 grams |

Each of the three solid blends were then pulverized to pass 325 mesh, compacted into void-free tablets, and tested for flow, cure rate and shelf stability before and after aging for 10 days, in a standard spiral flow mold.

| Sample | % Flow in Spiral Mold Initial | After 10 days at 50° C | Time to Become Rigid at 320° F |
|---|---|---|---|
| a | >96% | 55% | 1.5 minutes |
| b | >96% | 79% | 2 minutes |
| c | >96% | 96% | 2.5 minutes |

These results show that the product of this invention can be used to formulate fast curing, soft flow, shelf stable transfer or injection molding compounds. Although curing agent X-2 (no phenolic) has shelf stability inferior to that of curing agent X-1, it is seen that the cure rate with X-2 is somewhat faster than with X-1 and the shelf life is still clearly superior to the 2-methyl imidazole control (sample a). Thus, phenolic-free curing agents are useful in solid products such as fluid bed coatings, molding compounds, solid adhesive preforms, etc. where very long shelf life is not as difficult to obtain as in liquid epoxy resin mixtures and where very rapid cure rates are desirable.

EXAMPLE 9

This example illustrates the advantageous use of dicarboxylic acids as a third reactant with the imidazole compound and epoxy resin, to form novel curing agents according to the invention. Results will be demonstrated to be of the same order of magnitude of improvement as are obtained by the use of phenolic novolac resins as third reactants.

Three batches of curing agent were prepared according to the time-temperature cycle disclosed in Working Example 5 but using the following three formulae:

|   |   | grams |
|---|---|---|
| A: | Epoxy Resin B | 792 |
|    | 2-methyl imidazole | 208 |
| B: | Epoxy Resin B | 493 |
|    | 2-methyl imidazole | 134 |
|    | phenolic Resin B | 373 |
| C: | Epoxy Resin A | 646 |
|    | 2-methyl imidazole | 176 |
|    | Adipic acid | 178 |

In each case the "n" value is approximately unity.

Samples of each of the three curing agents were ground to pass 325 mesh and mixed with Epoxy Resin A at ratios of 8, 12 and 9 parts per hundred of resin respectively, to form three expoxy paste compositions identifiable as Pastes A, B and C. Paste A gelled at 25° C in 13 days. Pastes B and C remained fluid and workable after two months at 25° C. All three pastes cured to a hard solid within 2 minutes at 300° F.

Using the same procedure, another curing agent was prepared by reacting 320 grams of phthalic acid, 493 grams of Epoxy Resin B, and 134 grams of 2-methyl imidazole. When 10 parts of the resultant curing agent was incorporated into 100 parts of Epoxy Resin A, a shelf life in excess of 30 days at 25° C was realized. Nevertheless the composition cured within four minutes at 300° F.

EXAMPLE 10

This example is presented to illustrate novel compositions and processes of the invention wherein the curing agent is a synergistic mixture of dicyandiamid and the imidazole-epoxy reaction products as described hereinbefore.

A series of Epoxy A-based compositions were prepared each of which comprised various quantities of the curing agent described in Example 5 and also some dicyandiamid (hereafter called Dicy). In each case the Dicy was first ground to pass 400 mesh and then milled thoroughly with Epoxy A. The powdered curing agent of Example 5 was stirred into the resultant mixture in the quantities shown below. The gel time (in minutes to solidify at 280° F.) and cure time (in minutes at 280° F. to harden to the extent indentation with a sharp probe is resisted) of two controls and seven such mixtures are set forth in Table 10.

Table 10

| Sample | Dicy grams | Curing Agent grams | Gel Time (minutes) | Cure Time (minutes) |
|---|---|---|---|---|
| 1 | 0 | 7 | 5 | 20 |
| 2 | 5 | 2 | 10 | 40 |
| 3 | 5 | 4 | 5 | 16 |
| 4 | 5 | 7 | 3 | 10 |
| 5 | 7 | 2 | 10 | 40 |
| 6 | 7 | 3 | 5 | 25 |
| 7 | 10 | 2 | 8 | 30 |
| 8 | 12 | 2 | 8 | 20 |

Table 10-continued

| Sample | Dicy grams | Curing Agent grams | Gel Time (minutes) | Cure Time (minutes) |
|---|---|---|---|---|
| 9 | 12 | 0 | 60 | >60 |

In general, the synergistic effect can be obtained in compositions having dicyandiamid: curing agent weight ratios of from about 0.04:1 to about 25:1, best results being obtained at ratios from 0.3:1 to 1.5:1.

These data clearly show that small amounts of the curing agent, for example as used in Samples 2, 5 and 8 greatly reduce the cure time required to obtain a cure with Dicy. Moreover, a synergistic effect is obtained when optimum ratios of curing agent to Dicy are used. See the extraordinarily short cure times achieved with Samples 3 and 4.

It has, of course, been well known to those skilled in the art of compounding epoxy resins that either simple monomeric imidazoles or other tertiary amines can serve to accelerate Dicy cures of epoxy compositions. However, addition of simple imidazoles or other tertiary amines to Dicy-cured systems has heretofore had the effect of reducing the useful pot life of the system. For example, a composition comprising 100 grams of Epoxy Resin A, 7 grams of Dicy and 1 gram of DMP-30 (defined in Example 6) cures satisfactorily at 280° F but will gel within only 7 days at room temperature. Similar short gel times are observed if 0.5 grams of finely divided 2-methyl imidazole is substituted for the DMP-30. However, all of the curing agent/Dicy mixtures in Table 10 give at least 4 weeks pot life at room temperature. In cases where 3 or fewer parts of curing agent of Example 5 are used, the pot life is greater than 6 months.

To illustrate the excellent properties attainable with these curing agent/Dicy blends, a paste adhesive was prepared, containing:

| Epoxy Resin A | 1000 grams |
|---|---|
| Aluminum powder (Al 101) | 1000 grams |
| Bentone 38 | 40 grams |
| Syloid AL-1 | 30 grams |
| Curing Agent (Example 5) | 20 grams |
| Dicy (<400 mesh) | 100 grams |

Bentone 38 is the trade designation of a treated bentonite clay and commercially available from National Lead Company.

Syloid AL-1 is the trade designation of a silica aerogel useful as a moisture absorber; it is available from the Davidson Chemical Division of W. R. Grace Company.

The aluminum powder, obtained from Alcoa, is small enough to pass a 325-mesh screen.

This paste was made by milling the Dicy into ⅓ of the resin, separately milling the organophyllic bentonite into another one-third portion of the resin, and then combining these portions with the remaining ⅓ of the resin. The aluminum filler, the silica desiccating agent, and the powdered curing agent were then stirred in using a planetary mixer to form a thick paste having a viscosity of about 140,000 cps at 25° C. After 90 days storage at room temperature, the viscosity was still below 170,000 cps. Sixty mil thick strips of aluminum were bonded with this adhesive according to the procedure set forth in ASTM D-1002-24 and tensile shear values of 4500 psi were measured after a 20 minute cure at 280° F. Moreover, such ½ sq. inch overlap bonds gave 3500 psi tensile shear strength at 300° F which is an exceptionally high value for an epoxy adhesive at this elevated temperature.

EXAMPLE 11

This example is presented to demonstrate novel compositions comprising relatively low molecular weight nitrile rubbers and the novel curing agents of the invention.

A series of compositions were formed of:

|  | Sample a | Sample b | Sample c | Sample d |
|---|---|---|---|---|
| Epoxy Resin A | 100 grams | 100 grams | 100 grams | 100 grams |
| Pyrogenic silica | 3 grams | 3 grams | 3 grams | 3 grams |
| Al$_2$O$_3$ (325 mesh) | 50 grams | 50 grams | 50 grams | 50 grams |
| Hycar CTBNX | 25 grams | 0 | 25 grams | 0 |
| Dicy (<400 mesh) | 3 grams | 3 grams | 0 | 0 |
| Curing Agent (Example 5, <400 mesh) | 9 grams | 9 grams | 12 grams | 12 grams |

Hycar CTBNX is the trade designation of a low molecular weight acrylonitrile butadiene copolymer which contains about 2% by weight of carboxyl functionality. It is obtained from B. F. Goodrich and Company.

In each case, all components except the curing agent were mixed at high shear to form a smooth paste which was then cooled to below 95° F, after which the powdered curing agent was stirred in.

The following values were obtained on these 4 adhesives.

| Sample | Shelf Life at 25° C | Cure Time, 150° C | Tensile Shear, Al/Al bonds (ASTM D-1002-24) |
|---|---|---|---|
| a | >60 days | 3 minutes | 3000 |
| b | >60 days | 3 minutes | 2400 |
| c | >60 days | 3 minutes | 2800 |
| d | >60 days | 3 minutes | 2000 |

Note that in both cases, the addition of the nitrile rubber significantly improved the tensile shear strength, with no sacrifice in shelf life or cure rate.

EXAMPLE 12

This example is presented to illustrate novel compositions and processses wherein the curing agents of the invention are used in compositions comprising polyamide resins such as those known in the art as Nylon 11, Nylon 6-6, Nylon 6-10, any mixtures of these, and the like.

Sixty grams of a solid epoxy resin derived from Bisphenol A and having an epoxide equivalent of 1400 grams/epoxy was ground to pass 325 mesh and blended with 40 grams of Nylon 11 (as a 200 mesh powder) and 3 grams of the curing agent the preparation of which was disclosed in Example 4. The curing agent was used in the form of a powder which would pass a 400 mesh screen. This powder blend was demonstrated to be useful as a fluid bed coating powder. So used it formed tough resilient films on curing at 300° F and higher temperatures.

This powder blend was also demonstrated to have excellent solid adhesive properties when sprinkled on cold metal surfaces and then heated to achieve adherence of the surface of another article.

Thus, it is clear that the curing agents of the invention have utility in curing the so-called "nylon-epoxy" adhesives now in widespread commercial use.

EXAMPLE 13

This example is presented to show the utility of the bicyclic imidazoles such as benzimidazole and the like:

A quantity of 204 grams of Epoxy Resin B was heated to 60° C. Thereupon 80.0 grams of coarsely-ground benzimidazole were added, with good agitation, to the epoxy resin. An exothermic reaction took place, reaching 200° C 18 minutes after the addition of the benzimidazole. Heat was then applied to the reactor to maintain the temperature at 210° C for an additional hour. Thereupon 20 grams of the reaction mix, referred to hereafter as Sample 13A was withdrawn. At this time, 153 grams of Phenolic Resin B was slowly added to the reaction mixture over a period of about 8 minutes. After an additional 40 minutes, heating and stirring were stopped and the resultant product was allowed to cool at room temperature. This material is designated herein as Sample 13B.

The properties of Samples 13A and 13B are disclosed in Table 13:

Table 13

| | | Cure Rate & Pot Life with Epoxy Resin A | | | |
|---|---|---|---|---|---|
| Sample | Melting Point | Curing Agent* per 100 grams resin | Properties** of cured Film | Gel Time at 130° C | Pot Life at 25° C |
| 13A | 101 – 107° C | 10 grams | Excellent | 6 min. | 14 days |
| 13B | 102 – 110° C | 15 grams | Excellent | 6 min. | >28 days |

*ground to pass 400 mesh
**uniformity of cure, hardness, etc.

EXAMPLE 14

This example is presented to show the utility of an imidazoline, 2 phenyl -(2) imidazoline.

The same basic procedure as had been used in making Sample 13A was repeated except that the following reactants were used:

| Epoxy Resin B | 165 grams |
|---|---|
| 2 phenyl - (2) imidazoline, | 80 grams |
| Phenolic Resin B | 125 grams |

A peak exotherm of 160° C was reached in 18 minutes. The temperature thereafter was brought to and held at 215° C. A 20 gram sample, 14A, was taken after 40 more minutes. Thereupon, the Phenolic Resin B was added over about a 6-minute period, and the run was finally terminated 35 minutes after the completion of the addition of the phenolic resin. A sample of the material taken at the conclusion of the run is identified as Sample 14B in Table 14 below.

Table 14

| | | Cure Rate & Pot Life with Epoxy Resin A | | |
|---|---|---|---|---|
| Sample | Melting Point | Curing Agent/ grams/100 grams resin | Gel Time at 130° C | Pot Life (35° C) |
| 14A | 102–110° C | 10 | >10 min. | 21 days |
| 14 B | 113–121° C | 15 | 2 min. | 28 days |

Note that Sample 14A is not the preferred curing agent because it functions too slowly in comparison with the other curing agents of the invention. Sample 14B is an excellent curing agent as indicated by its pot life and quick gelling time at a cure temperature of 130° C.

EXAMPLE 15

A particularly advantageous use of the curing agents, and compositions incorporating the curing agents, of the invention is to form new high performance and highly stable tape and film adhesives. This example illustrates the wide variety of process which may be utilized in forming the novel tape and film adhesives of the invention:

An impregnating mixture was formed of a finely-powdered blend containing the following ingredients:

| | grams |
|---|---|
| Epon 1004 | 100 |
| X-1 (See Example 8) | 4 |
| Silica* | 15 |

*Sold under the trade designation "Super White" by Pfizer Corporation.

\* Sold under the trade designation "Super White" by Pfizer corporation.

A thin layer of the powdered blend was spread over a strip of fiber glass mesh. The mesh was then placed in an oven at 210° F for 20 minutes allowing powder to melt and impregnate the mesh. The adhesive in the impregnated strip removed from the oven has a stability of greater than 4 months at 25° C. Other adhesive-impregnating strips were prepared by impregnating the glass mesh with the adhesive powdered mix carried in a water slurry.

The performance of the powder-impregnated material as an adhesive was tested by pressing it between two metal plates at 270° F and 100 psig for about 20 minutes, after which it gave over 3000 psi tensile shear strength.

Similar tests were run on impregnating a powder blend consisting of 100 parts Epon 1004 and 4 parts of X-1, and a powder blend consisting of 100 parts Epon 1004, 2 parts of X-1 and 3 parts of Dicy.

In general, the powder-impregnated tapes are remarkably pore-free and have properties of high predictability because of their stable nature. They may be used to form laminates and for other applications over long periods of time without modifying processing conditions.

Another method for making the novel tape and film adhesives of the invention is to form a tape by impregnating with a solvent-based impregnating solution:

An example:

A liquid bath was prepared by thoroughly mixing the following ingredients:

| | grams |
|---|---|
| Epon 1001 | 100 |
| X-1 | 6.1 |

-continued

| | grams |
|---|---|
| Aluminum 101 | 100. |
| Xylene | 69. |
| Acetone | 69. |

The web (a 10-mil thick, medium weave continuous filament fabric) to be impregnated is passed through a bath of the above formulation and then through nip rolls. The rolls were adjusted to control the amount of material left in the web. The impregnated web was then passed through an oven at 100° C to flash off the solvent. The thermal stability of the resultant tape was good, remaining thermoplastic for 1 to 2 months.

Before provision of tape adhesives according to this invention, it was necessary to ship such tape adhesives of the imidazole-cured type in refrigerated containers, e.g., containers cooled by dry ice.

EXAMPLE 16

Twenty-five hundred grams of Epoxy B, a bisphenol A epoxy resin, were placed in a one gallon metal can and heated on a hot plate to 80° C. The consistency changed from syrupy (extremely viscous) at ambient temperature to water-thin as it was heated. While being heated the resin was stirred moderately with a 1 HP premier dispersator at about 10% power. The stirrer speed was subsequently raised until the hot liquid became turbulent. To the hot liquid was added 660 grams of 2-methyl imidazole. The ratio of epoxide equivalents of Epoxy B to moles of 2-methyl imidazole was about 1.4:1. The entire charge was added in less than a minute and viscous butterscotch-like dispersion was seen to form. Less than a minute later, the color changed to a deep brownish-purple, the viscosity fell markedly, and the temperature rose sharply to roughly 240° C. A white off-gas was noticed. Gentle stirring was continued for one hour while the temperature was held at 240° C. The mix was then cooled to a large solid chunk. This was broken up with a hammer and subsequently ground to less than 200 mesh. The finished product was dark brown and thermoplastic; it could be easily melted and remelted without setting up; MP = 100° C; it was soluble in dimethyl formamide and very brittle.

A one hundred gram charge of this fine powder was placed in a pint metal can and heated on a hot plate to 240° C. A dark, water-thin liquid resulted. Thirteen grams of trimesic acid were stirred in with a spatula (about 1.1 equivalent weights of the acid were added per mole of the imidazole originally used). The mixture was heated back up to 240° C. and stirred for 5 minutes; a clear solution formed, indicating solubility of the trimesic acid in the melted reaction product of Epoxy B and 2-methyl imidazole. The mass was then allowed to cool. A dark, brittle solid was formed. This was ground on a ball mill for 24 hours and was homogeneous in appearance. The powder passed a 325 mesh screen and was soluble in dimethyl formamide but not in methyl ethyl ketone. Its melting point, as measured in a capillary tube immersed in oil bath, was 98°–104° C. The material was thermoplastic as evidenced by its ability to be repeatedly melted and resolidified. This curing agent was used as described in the following paragraph.

Two separate masterbatch mixtures were prepared, one containing 200 grams of amorphous silica powder (particle size less than 225 mesh) in 1000 grams of Epoxy A, a bisphenol A epoxy resin, the second containing 25 grams of dicyandiamid in Epoxy A. Each masterbatch was prepared by adding the second ingredient to Epoxy A at room temperature and forcefully mixing with a dispersator in conventional manner. A mixture was now formed containing:

100 grams of the silica masterbatch
9 grams of curing agent
12 grams of the dicyandiamid masterbatch Components were added in the order listed to a 6 ounce glass jar and stirred very moderately with a dispersator for 5 minutes. The resultant mix was a homogeneous, heat-curable resin system. When smeared on a thin aluminum test panel, its cure time was 2.1 minutes at 275° F. and 40 seconds at 375°. The curing process was accompanied by a change in color from brownish to deep-purple black. The cured material was homogeneous but non-glossy. A portion of the uncured mix was stored in an oven at 35° C. and inspected periodically; no gelation was apparent after eight days, indicating that the useful shelf life of the composition (at 35° C.) was greater than 8 days.

EXAMPLE 17

The procedure of Example 16 was repeated except that other polycarboxylic acids were used in place of trimesic acid, the quantity of acid in each case being as indicated in the following table:

|   | Acid | Quantity in grams |
|---|---|---|
| A. | Succinic acid | 24 |
| B. | 1,3-Isophthalic acid | 16 |
| C. | 1,8-Naphthalic acid | 20 |
| D. | Hydrolyzed alternating copolymer of hexene and maleic anhydride, molecular weight approximately 10,000. | 18.5 |

These quantities in each case represent approximately 1.1 equivalent of acid per mole of 2-methyl imidazole.

The resultant curing agents were used as described in the last paragraph of Example 16. The properties of each curing agent and of its mixture with epoxy resin masterbatch are summarized in the following table:

|  | Properties of Curing Agent Solubility | | | Properties of Mixture of Curing Agent with Epoxy Resin Masterbatch Cure Time in Seconds | | |
|---|---|---|---|---|---|---|
|  | Dimethyl formamide | Methyl ethyl ketone | Melting point ° C. | 275° F. | 375° F. | Shelf Life in Days at 35° C. |
| Trimesic acid (Example 16) | Soluble | Swollen | 98–104 | 125 | 40 | >8 |
| A | Soluble | Insoluble | 110–15 | 180 | 115 | >8 |
| B | Soluble | Swollen | 75–80 | 360 | 45 | >8 |
| C | Soluble | Swollen | 85–90 | 110 | 45 | >8 |
| D | Soluble | Swollen | 115–120 | 90 | 80 | >8 |

Another particularly advantageous form in which the novel compositions containing curing agents of the invention may be utilized is in electrical potting compounds and, when filled with about from 8 to 90 volume percent of an electrically conductive metal powder, in radio frequency shielding. The particular advantage derived from the use of the curable compositions in such ratio frequency shielding operations and other electrical applications is derived from the fact that the relatively mild curing conditions required avoid subjection of the electronic components to undesirably high temperatures. Moreover, the excellent physical properties of the cured compositions also make their utilization as potting compounds highly desirable. Curable compositions containing conductive powder are also useful in forming electrical connections between electrical components.

What is claimed is:

1. A curing agent suitable for use with epoxy resin systems comprising the solid thermoplastic reaction product of an epoxy resin containing a plurality of oxirane groups and an imidazole compound selected from

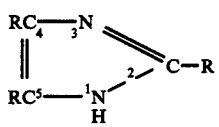

(a)

wherein R is hydrogen, alkyl, alkenyl, aryl, or halo;

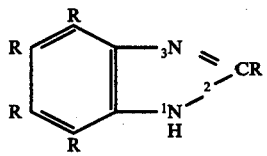

(b)

wherein R is defined as above;

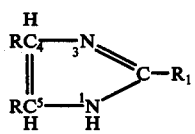

(c)

wherein R is defined as above and $R_1$ is alkyl, alkenyl, aryl, or halo; and d. mixtures of such compounds, the ratio of oxirane groups in the epoxy resin to the molecules of imidazole compound being between 1:1 and 2:1, said reaction product having a melting point from about 70° C. to about 140° C.

2. A curing agent suitable for use with epoxy resin systems comprising a solid thermoplastic reaction product of (1) an epoxy resin containing a plurality of oxirane groups and (2) an imidazole compound selected from

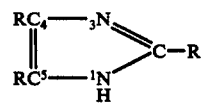

(a)

wherein R is hydrogen, alkyl, alkenyl, aryl or halo;

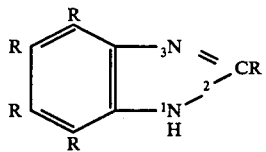

wherein R is defined as above;

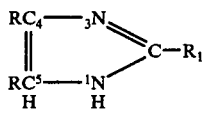

wherein R is defined as above and $R_1$ is alkyl, alkenyl, aryl or halo;

d. mixtures of such compounds, and (3) a polyfunctional proton-donor compound selected from the group consisting of polycarboxylic acids and phenolic novolac resins, the ratio of oxirane groups in the epoxy resin to the molecules of imidazole compound being between 0.8:1 and 2.2:1 and the ratio of acid equivalents of proton-donor compound to molecules of imidazole compound being up to 1.5:1, said epoxy resin having an epoxide equivalent weight from about 170 to about 2000, said reaction product having a melting point from about 70° C. to about 140° C.

3. The curing agent defined in claim 1 wherein the imidazole compound is selected from

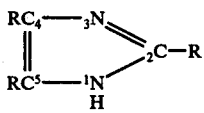

wherein R is hydrogen, alkyl, or phenyl and the cumulative total of all carbon atoms in the R groups is from 1 to 8;

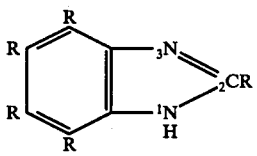

wherein R is hydrogen, alkyl or phenyl and the cumulative total of all carbon atoms in the R groups is from 1 to 8;

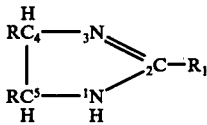

wherein R is hydrogen, alkyl or phenyl and $R_1$ is alkyl or phenyl and the cumulative total of all carbon atoms in the R and $R_1$ groups is from 1 to 8; and d. mixtures of such compounds.

4. The curing agent as defined in claim 3 wherein the imidazole compound is 2-ethyl, 4-methyl imidazole; 2-methyl imidazole, 2-phenyl-2-imidazoline, benzimidazole, or mixtures thereof.

5. The curing agent as defined in claim 1 wherein said epoxy resin has an epoxide equivalent weight from about 170 to about 2000.

6. The curing agent as defined in claim 1 wherein said epoxy resin is a diglycioyl ether formed of bisphenol A and epichlorohydrin or a glycidated novolac formed of epichlorohydrin and a phenolic novolac resin.

7. The curing agent as defined in claim 2 wherein the imidazole compound is selected from

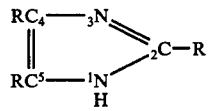

wherein R is hydrogen, alkyl, or phenyl and the cumulative total of all carbon atoms in the R groups is from 1 to 8;

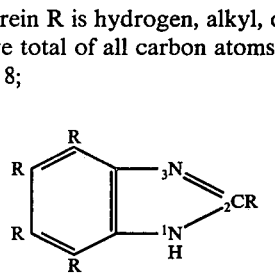

wherein R is hydrogen, alkyl or phenyl and the cumulative total of all carbon atoms in the R groups is from 1 to 8;

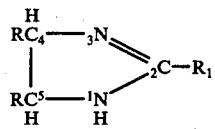

wherein R is hydrogen, alkyl or phenyl and $R_1$ is alkyl or phenyl and the cumulative total of all carbon atoms in the R and $R_1$ groups is from 1 to 8; and d. mixtures of such compounds.

8. The curing agent as defined in claim 2 wherein the imidazole compound is 2-ethyl, 4-methyl imidazole; 2-methyl imidazole, 2-phenyl-2-imidazoline, benzimidazole, or mixtures thereof.

9. The curing agent as defined in claim 2 wherein said epoxy resin is a diglycidyl ether formed of bisphenol A and epichlorohydrin or a glycidated novolac formed of epichlorohydrin and a phenolic novolac resin.

10. The curing agent of claim 2 wherein said polyfunctional proton-donor compound is an acid selected from the group consisting of chlorendic acid, maleic acid or itaconic acid, acids of the formula HOOC-$(CH_2)_n$-COOH, and aromatic dibasic acids.

11. The curing agent as defined in claim 3 wherein said epoxy resin has an epoxide equivalent weight from about 170 to about 2000.

12. Curable epoxy resin compositions comprising, as a curing agent therein, an effective quantity of the thermoplastic curing agent as defined in claim 1.

13. Curable epoxy resin compositions, comprising as a curing agent therein, an effective quantity of the thermoplastic curing agent as defined in claim 2.

14. Curable epoxy resin compositions, comprising as a curing agent therein, an effective quantity of the thermoplastic curing agent as defined in claim 5.

15. Curable epoxy resin compositions, comprising as a curing agent therein, an effective quantity of the thermoplastic curing agent as defined in claim 7.

16. Curable epoxy resin compositions as defined in claim 12 comprising, in addition to the thermoplastic curing agent therein, dicyandiamid in an amount up to 25 times the weight of said curing agent or an organic carboxylic acid anhydride in an amount to provide up to 1.425 anhydride equivalents for each epoxide equivalent of total epoxy resin.

17. Curable epoxy resin compositions as defined in claim 13 comprising, in addition to the thermoplastic curing agent therein, dicyandiamid in an amount up to 25 times the weight of said curing agent or an organic carboxylic acid anhydride in an amount to provide up to 1.425 anhydride equivalents for each epoxide equivalent of total epoxy resin.

18. Curable epoxy resin compositions as defined in claim 12 comprising, in addition to the thermoplastic curing agent therein, dicyandiamid in an amount from 0.04 to 25 times the weight of said curing agent.

19. Curable epoxy resin compositions as defined in claim 13 comprising, in addition to the thermoplastic curing agent therein, dicyandiamid in an amount from 0.04 to 25 times the weight of said curing agent.

20. An article of manufacture suitable for use as a sheet adhesive comprising an inert tape and an epoxy resin adhesive composition comprising a curing agent as defined in claim 2.

21. An article of manufacture suitable for use as a sheet adhesive comprising an inert tape and an epoxy resin adhesive composition comprising a curing agent as defined in claim 1.

22. An article of manufacture suitable for use as a sheet adhesive comprising an inert tape and an epoxy resin adhesive composition comprising a curing agent as defined in claim 8.

23. A process for converting a polyepoxide having more than one vicinal epoxy group per molecule into an insoluble, infusible product which comprises heating said polyepoxide at an elevated temperature with a curing amount of a combination comprising (1) a fusible, ketone-soluble adduct prepared by reacting (a) an epoxy compound containing at least two vicinal epoxy groups with (b) an imidazole compound of the general formula:

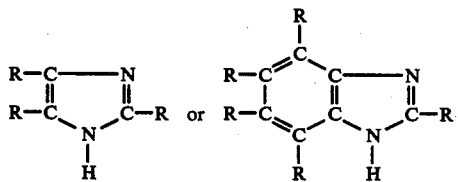

wherein each R is hydrogen or a hydrocarbon radical selected from the group consisting of alkyl and cycloalkyl radicals of up to 12 carbon atoms and aryl radicals, at a temperature from about 50° to 250° C. and for a time sufficient to complete the reaction, said epoxy compound and imidazole compound being employed in amounts to furnish from 0.8 to 2.2 epoxy groups per secondary amino group and (2) an epoxy co-curing agent selected from the group consisting of at least one carboxylic acid anhydride and dicyandiamide.

24. A process as in claim 23 wherein the adduct is prepared from a polyglycidyl ether of 2,2-bis(4-hydroxyphenyl) propane.

25. A process as in claim 23 wherein the co-curing agent is at least one polycarboxylic acid anhydride.

26. A process as in claim 23 wherein the co-curing agent is dicyandiamide.

27. A shelf-stable, heat-curable composition comprising (A) a polyepoxide having more than one vicinal epoxy group per molecule and a curing amount of (B) a combination comprising (1) a fusible, ketone-soluble adduct prepared by reacting (a) an epoxy compound containing at least two vicinal epoxy groups with (b) an imidazole compound of the general formula:

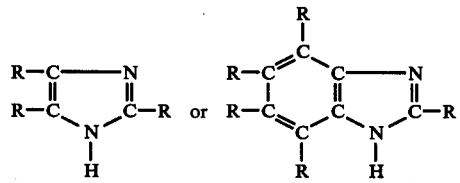

wherein each R is hydrogen or a hydrocarbon radical selected from the group consisting of alkyl and cycloalkyl radicals of up to 12 carbon atoms and aryl radicals, at a temperature from about 50° to 250° C and for a time sufficient to complete the reaction, said epoxy compound and imidazole compound being employed in amounts to furnish from 0.8 to 2.2 epoxy groups per secondary amino groups, and (2) an epoxy co-curing agent selected from the group consisting of at least one carboxylic acid anhydride and dicyandiamide.

28. A composition as in claim 27 wherein the imidazole adduct is employed in amounts from about 1% to 20% by weight of the polyepoxide.

29. A composition as in claim 27 wherein the adduct is prepared by reacting a polyglycidyl ether of 2,2-bis(4-hydroxyphenyl) propane having an average molecular weight of from about 350 to 400 with 2-methylimidazole.

30. A composition as in claim 27 wherein the co-curing agent comprises at least one carboxylic acid anhydride.

31. A composition as in claim 27 wherein the co-curing agent is dicyandiamide.

* * * * *

UNITED STATES PATENT AND TRADEMARK OFFICE
CERTIFICATE OF CORRECTION

PATENT NO. : 4,066,625

DATED : January 3, 1978

INVENTOR(S) : Justin C. Bolger

It is certified that error appears in the above-identified patent and that said Letters Patent are hereby corrected as shown below:

Column 1, in Table A, "1 benzyl, 2 Methyl-", should be --1 Benzyl, 2 Methyl- --;

Column 4, line 9, "then" should be --than--;

Column 4, line 10, delete "such";

Column 4, line 15, change "of" to --at--;

Column 8, line 14, "those" is misspelled;

Column 9, line 31, "epoxybutyl" is misspelled;

Column 9, line 37, "phenyldicarboxylate" is misspelled;

Column 9, line 40, "4,5-epoxytetradecyl" is misspelled;

Column 10, line 21, "U.s." should be --U.S.--;

Column 17, line 8, "$N_3$anhydride" should be --$N_3$ = anhydride--;

Column 18, line 33, "(4hydroxy" should be --(4 hydroxy --;

Column 23, lines 32-33, delete "*Sold under the trade designation "Super White" by Pfizer corporation." since this is repeated for a second time.

UNITED STATES PATENT OFFICE
CERTIFICATE OF CORRECTION

Patent No. 4,066,625  Dated January 3, 1978

Inventor(s) Justin C. Bolger

It is certified that error appears in the above-identified patent and that said Letters Patent are hereby corrected as shown below:

Column 28, line 5, "diglycidyl" is misspelled.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,066,625

DATED : January 3, 1978

INVENTOR(S) : Justin C. Bolger

It is certified that error appears in the above-identified patent and that said Letters Patent are hereby corrected as shown below:

Column 8, lines 37 to 43 and

Column 26, lines 27 to 33, that portion of the formula reading 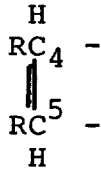 in each case should read 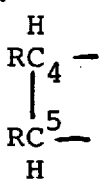

UNITED STATES PATENT AND TRADEMARK OFFICE
CERTIFICATE OF CORRECTION

PATENT NO. : 4,066,625
DATED : January 3, 1978
INVENTOR(S) : Justin C. Bolger

It is certified that error appears in the above-identified patent and that said Letters Patent are hereby corrected as shown below:

Column 27, lines 10 to 15, that portion of the formula reading $$\begin{array}{c} RC^4 - \\ \parallel_5 \\ RC - \\ H \end{array}$$

should read $$\begin{array}{c} H \\ | \\ RC^4 - \\ |_5 \\ RC - \\ H \end{array}$$

Signed and Sealed this

Twenty-first Day of July 1981

[SEAL]

Attest:

Attesting Officer

GERALD J. MOSSINGHOFF
Commissioner of Patents and Trademarks